United States Patent
Lepilleur et al.

(10) Patent No.: US 6,277,915 B1
(45) Date of Patent: Aug. 21, 2001

(54) BLOCK CHLORINATED POLYOLEFINS FOR USE AS IMPACT MODIFIER ENHANCERS FOR PVC OR CPVC

(75) Inventors: Carole Angèle Lepilleur, Akron; Robert Edwin Detterman, Medina, both of OH (US)

(73) Assignee: PMD Holdings Corporation, Brecksville, OH (US)

( * ) Notice: Subject to any disclaimer, the term of this patent is extended or adjusted under 35 U.S.C. 154(b) by 0 days.

(21) Appl. No.: 09/408,347

(22) Filed: Sep. 29, 1999

(51) Int. Cl.$^7$ ............................. C08L 27/04; C08F 14/02; C08K 5/02
(52) U.S. Cl. ..................... 525/76; 525/239; 525/331.5; 524/465; 524/455; 524/568; 428/339; 428/518
(58) Field of Search ........................ 525/76, 239, 331.5; 524/465, 568, 455; 428/339, 518

(56) References Cited

U.S. PATENT DOCUMENTS

| | | | |
|---|---|---|---|
| 2,592,763 | 4/1952 | Taylor | 260/94.9 |
| 2,890,213 | 6/1959 | Noeske | 260/94.9 |
| 2,913,449 | 11/1959 | Hoerger et al. | 260/94.9 |
| 2,928,819 | 3/1960 | Noeske | 260/94.9 |
| 3,085,082 | 4/1963 | Baer et al. | 260/45.5 |
| 3,396,211 | 8/1968 | Bonotto | 260/897 |
| 3,454,544 | 7/1969 | Young et al. | 260/88.2 |
| 3,563,974 | 2/1971 | Eckardt et al. | 260/94.9 |
| 3,585,117 | 6/1971 | Gresser et al. | 204/159.18 |
| 3,621,080 | 11/1971 | De Coene | 260/897 |
| 3,940,456 | 2/1976 | Frey et al. | 260/897 |
| 4,054,615 | * 10/1977 | Hardt et al. | 525/289 |
| 4,161,472 | 7/1979 | Lehr | 525/4 |
| 4,180,529 | 12/1979 | Hofmann | 525/85 |
| 4,197,386 | 4/1980 | Schoen | 525/356 |
| 4,234,703 | 11/1980 | Lindsay | 525/211 |
| 4,425,206 | 1/1984 | Hutchinson | 204/159.18 |
| 4,652,616 | 3/1987 | Kamiya et al. | 525/331.7 |
| 4,751,147 | 6/1988 | Stephens et al. | 428/523 |
| 4,767,817 | 8/1988 | Lee | 524/494 |
| 5,194,471 | * 3/1993 | Hartitz | 525/86 |
| 5,229,456 | 7/1993 | Ilenda et al. | 525/66 |
| 5,234,993 | 8/1993 | Huynh-Ba | 525/66 |
| 5,270,381 | 12/1993 | Yamanaka et al. | 524/569 |
| 5,308,894 | 5/1994 | Laughner | 523/436 |
| 5,338,803 | 8/1994 | Sun et al. | 525/309 |
| 5,340,880 | 8/1994 | Backman et al. | 525/331.6 |
| 5,352,735 | 10/1994 | Hofmann | 525/63 |
| 5,387,648 | 2/1995 | Ainsworth | 525/192 |
| 5,446,064 | 8/1995 | Hori et al. | 524/536 |
| 5,457,146 | 10/1995 | Ogoe et al. | 524/409 |
| 5,460,818 | 10/1995 | Park et al. | 426/415 |
| 5,464,903 | 11/1995 | Hofmann | 525/185 |
| 5,478,887 | 12/1995 | Huynh-Ba | 525/66 |
| 5,502,111 | 3/1996 | Huynh-Ba | 525/239 |
| 5,525,651 | 6/1996 | Ogoe et al. | 523/436 |
| 5,525,679 | 6/1996 | Effler, Jr. et al. | 525/334.1 |
| 6,124,406 | 9/2000 | Cinadr et al. . | |

FOREIGN PATENT DOCUMENTS

| | | |
|---|---|---|
| 822201 | 9/1969 | (CA) . |
| 0131937 | 1/1985 | (EP) . |
| 0285824 | 10/1988 | (EP) . |
| 0343657 | 11/1989 | (EP) . |
| 0612602 | 8/1994 | (EP) . |
| 0618260 | 10/1994 | (EP) . |
| 0695782 | 2/1996 | (EP) . |
| 2381069 | 9/1978 | (FR) . |
| 1144640 | 3/1969 | (GB) . |
| 1161614 | 8/1969 | (GB) . |
| 2172289 | 9/1986 | (GB) . |
| 51138791 | 11/1976 | (JP) . |
| 584721 | 1/1983 | (JP) . |
| 7290648 | 11/1995 | (JP) . |
| 930995 | 12/1997 | (JP) . |
| WO 9854247 | 12/1998 | (WO) . |
| WO 9950316 | 10/1999 | (WO) . |

OTHER PUBLICATIONS

Journal of Applied Polymer Science, vol. VI, No. 19, pp. 20–31, 1962, Canterino et al., "Chlorinated and Chlorosulfonated Polyolefins".

Polymer Engineering and Science, vol. 13, No. 3, May 1973, pp. 202–208, Paul et al., "Chlorinated Polyethylene Modification of Blends Derived from Waste Plastics Part I: Mechanical Behavior".

Polymer Engineering and Science, vol. 13, No. 4, Jul. 1973, pp. 308–318, Locke et al., "Chlorinated Polyethylene Modification of Blends Derived from Waste Plastic Part II: Mechanism of Modification".

Journal of Applied Polymer Science, vol. 33, 1987, pp. 1231–1240, Lee et al., "Properties of PVC/CPE/EPDM Polyblends".

(List continued on next page.)

*Primary Examiner*—Nathan M. Nutter
*Assistant Examiner*—Olga Asinovsky
(74) *Attorney, Agent, or Firm*—Thoburn T. Dunlap; Valerie L. Calloway

(57) ABSTRACT

Block chlorinated polyolefins are disclosed as performance enhancer of high rubber graft copolymers or chlorinated polyethylenes impact modifier in PVC and/or CPVC resins. The block chlorinated polyolefins (e.g. block chlorinated polyethylene) provide good dispersion of the impact modifier particles in the matrix and better adhesion between the impact modifier and the PVC and/or CPVC interface, providing better physical properties such as impact strength as measured by Notched Izod than did the randomly chlorinated polyolefins, often used as processing aids and as impact modifiers in PVC or CPVC. The differences in properties achieved with block chlorinated polyolefins versus randomly chlorinated polyolefins are attributed to the individual blocks of the blocky polyolefin being compatible with either the impact modifier or the PVC/CPVC resulting in better adhesion between phases.

40 Claims, No Drawings

OTHER PUBLICATIONS

Polymer Engineering and Science, Mar. 1987, vol. 27, No. 6, pp. 391–397, Xiande et al., "A Study on Poly(Vinyl Chloride) Blends With Chlorinated Polyethylene and Polyethylene".

Materiale Plastice, vol. 25, No. 2, pp. 77–82, Vasile et al, "Compatibility in the System Polyethylene–PVC . . . ".

Polymer Engineering and Science, vol. 28, No. 18, Sep. 1988, pp. 1167–1172, Chang et al., "Chlorinated High Density Polyethylene I. Chain Characterization".

Polymer Engineering and Science, vol. 28, No. 18, Sep. 1988, pp. 1173–1181, Chang et al., "Chlorinated High Density Polyethylene II. Solid State Structure".

National Conference Advanced Polymer Technology, 1991, vol. 203, No. 9, pp. 203–209, Francis et al., "Chlorinated Polyethylene as a Compatibilizer For Poly(Vinyl Chloride)/Polyethylene Blend".

Polymeric Materials Science and Engineering, vol. 8, No. 5, Sep. 1992, pp. 56–60, Shu et al., "Effects of Chlorinated Polyethylene on the Theological Property of PVC/Polypropylene Blends".

Polymeric Materials Science and Engineering, vol. 8, No. 3, May 1992, pp. 57–60, Shu et al., "Morphology of Poly(Vinyl Chloride)–Polypropylene Blends".

Journal of Vinyl Technology, Mar. 1994, vol. 16, No. 1, pp. 16–20, Hofmann et al. "Plasticization of PVC With Ethylene Copolymer Resins".

Polymeric Materials Science and Engineering, vol. 10, No. 1, Jan. 1994, pp. 28–32, Zheng et al., "Preparation and Mechanical Properties of PVC/EPDM Alloy".

Chinese Journal of Applied Chemistry, vol. 13, No. 5, pp. 52–55, Oct. 1996, He et al., "Effect of Solid State Chlorinated Polyethylene On Properties and Morphology of PVC/LLDPE Blends".

* cited by examiner

BLOCK CHLORINATED POLYOLEFINS FOR USE AS IMPACT MODIFIER ENHANCERS FOR PVC OR CPVC

FIELD OF INVENTION

The present invention relates to improved thermoplastic formulations exhibiting an improved combination of properties. A block chlorinated polyolefin can be added to vinyl halide resin compositions such as post chlorinated polyvinyl halide (CPVC) and polyvinyl chloride (PVC) to enhance the properties of impact modifiers selected from high rubber graft copolymers and conventional randomly chlorinated polyethylene (CPE). The synergetic effect of the block chlorinated polyolefin with the selected impact modifier dramatically enhances the impact properties of PVC and CPVC compositions. Blends of PVC, CPVC, and PVC/CPVC resins with the block chlorinated polyolefin and the selected impact modifiers have enhanced impact resistance, while retaining high heat distortion temperature (relative to the base CPVC or PVC) and good stress strain properties. The block chlorinated polyolefin comprises a polymeric product having both high chlorine content blocks (e.g., up to 50–75 wt. % chlorine) and relatively non-chlorinated crystallizable polyolefin blocks. The resulting polymer is characterized as blocky. The crystallizable polyolefin blocks are generally part of the same polymer that is chlorinated.

BACKGROUND OF INVENTION

Polyvinyl chloride and post chlorinated polyvinyl chloride, in order to perform adequately for the intended use is generally formulated with impact modifiers, and flow enhancing additives among other additives to arrive at a balance of properties. Each additive chosen for one particular advantage is often accompanied by a corresponding undesired effect in another property. Additives such as conventional randomly chlorinated polyethylenes (e.g., Tyrin® from Dupont Dow Chemical) have been used in PVC or CPVC blends, generally as a processing aid and impact modifier. These chlorinated polyethylenes have been randomly (relatively homogeneously) chlorinated by using a swelling solvent and/or a chlorinating temperature above the crystalline melting temperature of the polyethylene. Traditionally those who chlorinated polyethylene wanted to eliminate the crystalline polyethylene phase by chlorinating the crystallizable polyethylene segments, which inhibits or prevents further crystallization of the polyolefin. Residual crystalline fractions in a chlorinated polyethylene would require a processing temperature above the melting point while amorphous polyethylene fractions can be processed at a lower temperature. The use of higher chlorination temperatures and swelling solvents (which decrease residual crystallinity) also increase the rate of the chlorinating reaction, thus reducing costs. It has even been postulated that highly crystalline polyethylene would not be effectively chlorinated unless either it was heated above the crystalline melting temperature or the crystallinity was reduced by using a swelling solvent. This invention relates to the use of block chlorinated polyolefins as additives to improve the efficiency of selected impact modifiers such as high rubber graft copolymers or chlorinated polyethylenes in CPVC and PVC formulations.

SUMMARY OF INVENTION

Block chlorinated polyolefins (e.g., polyethylenes) can be prepared having from about 10 or 20 to about 60 wt. % bound chlorine based on the weight of the chlorinated polyolefin (e.g., polyethylene) and having from above about 25 to about 99 wt. % residual crystallizable polyolefin blocks, wherein said wt. % residual crystallizable blocks are expressed as a percentage based on the weight of crystallizable polyolefin in the polymer before chlorination. Such block chlorinated polyolefins can be prepared by a chlorination process employing a semi-crystalline polyolefin precursor comprising reacting the semi-crystalline polyolefin in a generally unswollen state at a temperature below its crystalline melting temperature with chlorine for a short period of time. Depending on the reaction conditions chosen (mostly time, chlorine pressure, and temperature), a free radical source, a catalyst, and/or UV radiation may be useful in the chlorination process. When the reaction conditions are suitable for quick chlorination, the amorphous portion of the polyolefin becomes highly chlorinated while the crystalline portion of the polyolefin remains significantly in the crystalline state.

Additives such as the block chlorinated polyolefin (e.g., block chlorinated polyethylene) can improve the performance of selected impact modifiers such as high rubber graft copolymers or conventionally chlorinated polyethylenes (amorphous chlorinated polyethylene) by enhancing their dispersability in PVC, CPVC, or PVC/CPVC blends. Without wishing to be bound by theory of invention it is believed that the block chlorinated polyolefins of this invention improve the adhesion between the impact modifier rubber phase and the PVC and/or CPVC.

DETAILED DESCRIPTION OF THE INVENTION

Block chlorinated polyolefins can be used to greatly enhance the impact performance of selected impact modifiers in PVC, CPVC, and PVC/CPVC blends. The resulting PVC, CPVC, or blended PVC/CPVC compound can be used for generally any application (e.g., vinyl siding, sheathing, tubing or pipe, molded articles, etc.). The impact modifiers are selected from high rubber graft copolymers and conventional randomly chlorinated polyethylenes or mixtures thereof. These impact modifiers are currently used in PVC and CPVC formulations to impart good processability and impact strength. When a block chlorinated polyolefin is added in the proper amount to a high rubber graft copolymer or to a conventional chlorinated polyethylene impact modifier, the resulting impact properties of the PVC or CPVC formulations are dramatically enhanced. The block chlorinated polyolefins of the present invention enhance the properties of impact modifiers such as high rubber graft copolymers or randomly chlorinated polyethylenes.

The block chlorinated polyolefins are prepared by a chlorinating a polyolefin at low temperatures such that a substantial portion of the crystalline regions of the polyolefin backbone (e.g., polyethylene) remain crystalline and less effectively chlorinated than the amorphous regions of the polyolefin backbone. This results in a blocky polymer as each polymer chain usually has both crystalline and amorphous regions in the backbone. The semi-crystalline polyolefin precursor to the block chlorinated polyolefin has desirably at least above about 25 wt. %, desirably at least 30 wt. %, more desirably at least 45 wt. %, and preferably at least 50 wt. % crystalline polyolefin portions in the backbone. Unless otherwise defined weight percent (wt. %) crystallinity is measured by differential scanning calorimeter (DSC) on prepared samples of the polyolefin using a heating rate of 10C/min. starting at −150° C. and ending at 250° C. For the purpose of calculations the heat of melting (ΔH) of crystalline polyolefin precursor is measured by DSC. For the chlorinated polyolefins the sample weight for ΔH measurements excludes the weight of bound chlorine.

The polyolefin precursor desirably contains at least 85, more desirably at least 90, preferably at least 95 mole %, and more preferably at least 98 mole % repeat units polymerized from monoolefins of 2 to 10 carbon atoms. Preferably the repeating units of the polyolefin are polymerized from alpha-monoolefins having from 2 to 4 carbon atoms. Preferred alpha-monoolefins include ethylene, propylene, and butene, most preferably ethylene. The polyolefin can be prepared by any polymerization process but Ziegler-Natta, Phillips, and metallocene polymerization processes are preferred as they result in high weight percentages of crystallinity. The foregoing olefinic monomers can be polymerized with other copolymerizable monomers so long as the polymer properties are not deleteriously affected. Preferably the polyolefins have densities at 25° C. of from about 0.93, or 0.94 to about 0.965, 0.97, or 0.98 g/cc. Desirably they have crystalline melting temperatures from about 110–160° C. or 124° C. to about 130, 135 or 160° C. and melt index values (ASTM D-1238 FR-E) of from about 0.01 to 40, about 0.05 to 20 preferred, and about 0.1 to 10 most preferred.

The chlorination procedure can be done in any media, preferably water, which does not appreciably swell the polyolefin (e.g., less than 10% increase in volume due to equilibrium swelling of the precursor polyolefin at 25° C. with the media, and preferably less than 5 volume % increase). The chlorination temperature is desirably less than 100° C. and more desirably from about 40° C. to about 90° C. or 100° C. and preferably from about 50° C. to about 70° C. or 80° C. The chlorination media can be a liquid at the chlorination conditions (temperature, pressure, etc.) or a gas. The precursor polyolefin is desirably in a particulate form with average particle size desirably from about 20 to about 500 μm. The chlorine can be added as a gas or a liquid and can be at pressures from about 5 or 10 pounds per square inch absolute (psia) to several hundred psia, and is preferably from about 15 to about 90 psia and most preferably from about 50 to about 90 psia. The amount of chlorine added can be determined in both systems by weight difference measurements either on the reactor or on the chlorine source. Alternatively or additionally the chlorine can be metered in.

Depending on the chlorination temperature it may be desirable to provide a free radical source, a catalyst, or ultraviolet radiation (UV) to accelerate the reaction. An example of a free radical source includes organic peroxyesters. An example of a catalyst includes oxygen. Examples of UV radiation include any light source capable of providing radiation in the UV range. The free radical sources, catalysts, and UV sources are well known to the chlorination art. Desirably any oxygen which may be in the reactor or with the polyolefin is removed prior to chlorination when UV and peroxyester processes are employed. The type, amount, and optimization conditions are disclosed in numerous patents and publications on chlorinating polymers and need not be discussed in detail here. The difference between prior chlorination processes and the process of this invention is the general absence of swelling solvents, and low temperature reaction conditions. After the chlorination is completed the chlorinated polyolefin is recovered from the media. Any by-products (e.g., HCl, etc.) can be removed or neutralized along with the removal of the excess chlorine, if any. Then the chlorinated polyolefin can be washed and dried in conventional manner.

The block chlorinated polyolefin desirably has a chlorine content from about 10, 20, 25, 27, 30, or 35 wt. % bound chlorine to about 50, 55, or 60 wt. % chlorine. Generally, the lower chlorine content chlorinated polyolefins have better compatibility with PVC and the higher chlorine content chlorinated polyolefins are preferred for high chlorine content CPVC. Intermediate chlorine content chlorinated polyolefins are preferred for intermediate chlorine content CPVC. Desirably the block chlorinated polyolefin contains above 25 wt. % residual crystallinity, desirably at least 30 wt. %, and more desirably above 50 wt. % residual crystallinity. More preferably, the residual crystallinity can range from about 40, 50, 60, 70 or 80 to about 70, 80, 90, 95, or more wt. %. The percent residual crystallinity is the crystallinity of the chlorinated polyolefin corrected for the chlorine content, expressed as a percentage of the crystallinity of the polyolefin precursor. A more detailed description and example calculations follow later. Desirably the crystalline phase has a melting temperature similar to the starting polyolefin (e.g., about 110, 120 or 124° C. to about 130, 135, or 160° C.).

The impact modifiers of this invention comprise high rubber graft copolymers and randomly chlorinated polyethylene elastomers. The high rubber graft copolymers are prepared by graft polymerizing less than about 50 wt % of at least one rigid monomer such as a vinyl aromatic monomer, an acrylic monomer, a vinyl nitrile monomer or a mixture thereof in the presence of more than about 50 wt % of a preformed rubbery polydiene substrate such as 1,3-diene polymer or copolymer thereof. In particular, the graft copolymers comprise from 50 wt % to 90 wt % of a rubbery substrate polydiene such as for example polybutadiene or polyisoprene or a copolymer of a 1,3-diene with less than about 50 wt % of a copolymerizable vinyl or vinylidene monomer such as for example an olefin, a styrene monomer, a (meth)acrylate ester monomer or a (meth)acrylonitrile monomer, and from 10 to 50 wt % of a rigid graft phase formed from at least one rigid vinylidene or vinyl monomer selected from the group consisting of vinyl aromatic monomers, (meth)acrylic monomers, vinyl nitrile monomers and mixtures thereof. A rigid monomer is a hardening monomer and for the purposes of this invention means a polymerizable vinyl or vinylidene monomer that when homopolymerized would exhibit a glass transition temperature greater than 20° C. The term rubbery substrate or rubbery copolymer means, as is conventionally recognized, a polymer having a rubbery or elastomeric character including a glass transition temperature generally below 0° C. and preferably below −70° C. The rubbery polymer can contain a polydiene which is partially hydrogenated.

In the preparation of the high rubber graft copolymers, either or both the rubbery or the rigid graft component may further include minor amounts, less than about 5 wt % of a copolymerization crosslinking monomer(s) such as di- or tri-functional monomer or combinations thereof to increase graft linking or/and crosslinking of either or both components. Preferably, crosslinking monomer(s) are absent. The high rubber graft copolymers can be prepared by conventional polymerization processes including emulsion, suspension, sequential emulsion-suspension, bulk and solution polymerization processes. These methods are known in the polymerization art, specifically directed toward the preparation of a wide variety of high rubber graft copolymers for impact modification of thermoplastic resins. Suitable specific embodiments of the particular impact modifiers can be prepared by any aforementioned polymerization means. The preferred polymerization processes are in aqueous media and include emulsion and suspension methods. The preferred process for preparing the rubbery portion is by way of emulsion polymerization as taught in the art.

An exemplary high rubber graft copolymer composition includes the class of high rubber ABS graft copolymer resins, which may generally be described as graft copolymers of styrene and acrylonitrile on butadiene containing rubbers. Other high rubber graft copolymers include non-ABS polydiene rubber containing graft copolymers including methylmethacrylate-styrene-acrylonitrile grafted on polybutadiene or styrene-butadiene rubbers (MABS resins) and graft copolymers of methylmethacrylate and styrene grafted on polybutadiene or styrene-butadiene rubbers (MBS resins).

Conventional randomly chlorinated polyolefins can be used in the PVC and/or CPVC compositions to impart particular characteristics (e.g., aid fusion, dispersion and enhance impact strength). Chlorinated polyethylenes (CPE) used as impact modifiers generally have a weight average molecular weight in a range of about 70,000 to about 280,000; and a number average molecular weight in the range of 18,000 to 40,000 and a chlorine content from about 25 to 44 wt. %. Dupont Dow manufactures and markets Tyrin®, a randomly chlorinated series of polyethylenes, specifically for inclusion with PVC and CPVC. The Tyrin® series of CPE products are reported to contain between 0 and 25 wt. % residual crystallinity calculated from the precursor polyethylene, with a majority of the series containing 10 wt. % or less of residual crystallinity. Chlorinated polyolefins, e.g., polyethylene, can have densities below that of the precursor polyolefin e.g., 0.91 to 0.98 g/cc or above that of the precursor polyolefin e.g., 1.00 to 1.4 g/cc depending on the chlorine content. The addition of a small amount of chlorine by conventional methods randomly along the entire polymer chain disrupts the crystallinity. Since the crystalline portions are denser than the amorphous regions the density of the polymer is lowered. Due to the dense nature of chlorine, the addition of more chlorine pushes the density of chlorinated polyolefins up above 1 to about 1.4 g/cc when chlorine atoms are present in sufficient amount. Randomly chlorinated polyolefins have a lower heat of melting than blocky chlorinated polyolefins. These CPE impact modifiers are prepared by randomly chlorinating high density polyethylene, by suspension solution or gas phase methods, as taught in the art.

The polyvinyl chloride (PVC) suitable for use in the present invention is desirably a polymer or copolymer having at least 70 wt. % repeating units polymerized from vinyl chloride and can contain up to 30 wt. % repeating units polymerized from other copolymerizable monomers. These polymers are well known to the art and are commercially available. Desirably, the PVC contains is at least 80 or 90 wt. % repeating units polymerized from vinyl chloride with a residual of up to 10 or 20 wt. % of the repeating units being derived from copolymerizable monomers. Copolymerizable comonomers include alkyl-acrylates, vinyl acetate, acrylonitriles, styrene etc. Generally PVC has a Vicat B softening temperature (ASTM D-1525) of about 75 to about 120° C. and is processed from about 170 to about 200° C. Desirably the PVC has an inherent viscosity as measured by ASTM D-1234-66 from about 0.4 to about 1.6, more desirably from about 0.5 to about 1.6 and a density from about 1.3 to about 1.4 g/cm³.

The chlorinated polyvinyl chloride (CPVC) is also known to the art and readily commercially available. Desirably it has a chlorine content from about 57, 59, 63, or 65 wt. % to about 71, 73, or 74 wt. %. Desirably it has been prepared from a PVC having an inherent viscosity of from about 0.5 or 0.6 to about 1.2. The inherent viscosity of the CPVC, although harder to measure than that of PVC, is generally the same as the precursor PVC. Chlorinated polyvinyl chloride is often made in a solution process, fluidized bed process, water-slurry process, thermal process, or a liquid chlorine process. The CPVC resins generally have a glass transition temperature of at least 10° C. higher than the glass transition temperature of the PVC resin from which they were made. Desirably the PVC from which the CPVC is made has at least 95 wt. % repeating units polymerized from vinyl chloride.

As is practiced in the art the PVC resin can be blended in a variety of proportions with the CPVC resin to prepare polymer compositions with intermediate properties (such as softening temperature) to those of PVC or CPVC. The amount of CPVC to be included in the blend can range from about 1 to about 50% by weight based on the total weight of the blended resin. Furthermore, CPVC resins can be blended with PVC. The amount of PVC to be included ranges from about 1 to 50 % by weight based upon the total weight of the blended resin.

In addition, blends of various CPVC resins can also be employed. In these instances, the CPVC resin can be blended with another CPVC resin in an amount of other resin of about 1% to about 50% by weight based upon the total weight of the blended resin.

The amount of the block chlorinated polyolefin and impact modifier in the PVC and/or CPVC compounds is traditionally based upon 100 parts by weight of the base PVC and/or CPVC resin. The amount of the block chlorinated polyolefin (b-CPE) is desirably from about 0.1 to about 10 parts by weight, more desirably from about 0.25 to about 5 parts by weight. The amount of the high rubber graft copolymers is desirably from about 1 to about 30 parts by weight and more desirably from about 3 to about 20 parts by weight. The amount of the randomly chlorinated polyethylene impact modifier is desirably from about 1 to about 30 parts by weight and more desirably from about 5 to about 15 parts by weight.

It should be noted that mixtures of different compositions of b-CPE and impact modifiers (e.g., high rubber graft copolymers and randomly chlorinated polyethylenes) can be utilized. For example, various b-CPE's having different physical properties such as chlorine content, residual crystallinity, densities, etc., can be employed in the same composition.

PVC and/or CPVC can be compounded with a wide variety of other ingredients to increase processability and other properties of the in-process or finished (molded or shaped) article. Thermal stabilizers are beneficial and include for example di-butyl tin compounds in amounts from about 1 to about 5 parts by weight per 100 parts PVC and/or CPVC. Other stabilizers may include metal salts of phosphoric acid, polyols, or epoxidized oils. These can be used in amounts from about 0.1 to about 7 parts by weight. Lubricants such as paraffin waxes, low molecular weight polyethylene, oxidized polyethylenes, fatty acids and their salts, fatty alcohols, metal soaps, fatty amides, fatty esters, can be included in PVC and/or CPVC compounds. Processing aids such as Paraloid™ K 120 ND from Rohm and Haas can be added. Fillers are optional and include clay, silica, wollastonite, mica, barytes, calcium carbonate, titanium dioxides, and talc.

The method of compounding is straightforward as any high intensity method known to uniformly mix and fuse the components into a homogeneous compound such as a Banbury mill, followed by sheeting, slitting or extrusion into pellets or cubes can be used. The differences in processing and handling of CPVC compared with PVC relate mainly to the temperature and viscosity differences and care to avoid too much work and shear burning. Alternatively a twin screw extruder or other effective high shear mixer may be substituted for one or more of the above steps.

A characteristic property of the blocky chlorinated polyethylenes synthesized by this process is their substantial residual crystallinity which can be measured via thermal analysis, i.e., by differential scanning calorimetry (DSC). As is known, DSC, as described in *Textbook of Polymer Science* by Fred Billmeyer (second edition, page 121), is a technique in which the temperature of a reference substance and a sample are measured and controlled to conform to a predetermined time-temperature program. At the same time, temperature differences which develop between the reference and the sample, especially when the sample undergoes a thermal transition, are compared and the heat input in both the reference or the sample is adjusted to maintain equal temperatures. A signal proportional to these power differences is then plotted. The area under the resulting curve is a direct measure of the heat of transition. The percent crystallinity of the blocky chlorinated polyethylenes can be quantitatively established by comparing the area under the peak corresponding to the heat of melting, divided by the area under the peak corresponding to the heat of melting of a standard sample of known crystallinity. The residual crystallinity of the chlorinated polyethylenes herein cited can be established by using the ratio of the corrected heat of melting (enthalpy of fusion) of the prepared chlorinated samples (i.e., corrected so to be estimated per gram of polyethylene by subtracting the weight of bound chlorine from the sample weight) over the enthalpy of fusion of the precursor polyethylene (%$\Delta H_R$ of residual polyethylene crystallinity).

An example of the calculation for the residual polyethylene crystallinity of a chlorinated polyethylene is as follows:

The enthalpy of fusion ($\Delta H$) for a chlorinated polyethylene, containing 25 wt. % chlorine (about 75 wt. % polyethylene) was measured by DSC and found to be $\Delta H_{CPE\,uncorrected}$=117 J/g. So the enthalpy of fusion per gram of polyethylene (corrected for the weight of chlorine) will be $\Delta H_{CPE}$=117/0.75 or $\Delta H_{CPE}$=156 J/gPE. The enthalpy of fusion of the starting polyethylene before chlorination was found to be $\Delta H_{PE}$=161 J/g. So the residual polyethylene crystallinity can be calculated as being the ratio 156/161 or about 0.97, i.e., 97% of residual polyethylene crystallinity. This shows that essentially only the amorphous polyethylene phase was chlorinated.

Chlorine content of the blocky chlorinated polyethylenes (b-CPE) were measured by $^{13}$C-NMR. Approximately 10 wt. % of b-CPE is dissolved in 1,2,4-trichlorobenzene. Benzene-d6 is added at about 10% by volume of the total solvent for the deuterium lock. One drop of hexamethyldisiloxane is added as a chemical shift reference. Carbon-13 data is collected with overnight data accumulation using conditions such as, 110° C. measurement temperature, total delay time between pulses of 7.5 seconds, 90° C. Carbon-13 pulse and a composite pulse decoupling (CDP) with no corrections for Nuclear Overhauser Effect (NOE) differences.

The following examples are included herein for purposes of illustration only and are not intended to be limiting of the scope of the invention.

EXAMPLES

Example 1
Blends of PVC, Block Chlorinated Polyethylene and MABS Impact Modifier Blends of Vista® PVC 5525 (I.V.=0.51) MABS impact modifier and two different types of block chlorinated polyethylene (b-CPE) were formulated according to the following recipe:

| Ingredients (phr): | 1 | 2 | 3 |
| --- | --- | --- | --- |
| PVC resin (0.51 IV) (phr) | 100 | 100 | 100 |
| Dibutyltin bis-thioglycolate stabilizer | 1.6 | 1.6 | 1.6 |
| MABS 1 | 14.0 | 14.0 | 14.0 |
| Calcium stearate | 1.5 | 1.5 | 1.5 |
| Ethylene bis-stearate | 1.5 | 1.5 | 1.5 |
| Titanum dioxide | 1.0 | 1.0 | 1.0 |
| b-CPE 1 (MI$^{(a)}$ = 8.4, 40% Cl, X$^{(b)}$ = 60%) | | 2.0 | |
| b-CPE 2 (MI = 0.7, 40% Cl, X$^{(c)}$ = 90%) | | | 2.0 |

$^{(a)}$ ASTM D-1238 FR-E
$^{(b)}$ X is the residual crystallinity for the b-CPE and is calculated as follows: The enthalpy of fusion ($\Delta H$) for b-CPE 1 containing 40 wt. % chlorine (about 60 wt. % polyethylene) was measured by DSC and found to be $\Delta H_{CPE\,uncorrected}$ = 65J/g. So the enthalpy of fusion per gram of polyethylene (corrected for the weight of chlorine) will be $\Delta H_{CPE}$ = 65/0.60 or $\Delta H_{CPE}$ = 108J/gPE. The enthalpy of fusion of the starting polyethylene T60800 before chlorination was found to be $\Delta H_{PE}$ = 181J/g. So the residual polyethylene crystallinity (X) can be calculated as being the ratio X = 108/181 or about 0.60, i.e., 60% of residual polyethylene crystallinity.
$^{(c)}$ The enthalpy of fusion ($\Delta H$) for b-CPE 2 containing 40 wt. % chlorine (about 60 wt. % polyethylene) was measured by DSC and found to be $\Delta H_{CPE\,uncorrected}$ = 103J/g. So the enthalpy of fusion per gram of polyethylene (corrected for the weight of chlorine) will be $\Delta H_{CPE}$ = 103/0.60 or $\Delta H_{CPE}$ = 172J/gPE.
The enthalpy of fusion of the starting polyethylene LM600700 before chlorination was found to be $\Delta H_{PE}$ = 191J/g. So the residual polyethylene crystallinity (X) for b-CPE2 can be calculated as being the ratio X = 172/191 or about 0.90, i.e., 90% of residual polyethylene crystallinity

| Low temperature Impact results: Izod impact, notched, @ 32° F., ASTM D256 | | | |
| --- | --- | --- | --- |
| ft. lb./in. | 8.5 | 13.8 | 14.4 |
| std. dev, | 4.2 | 2.6 | 2.2 |
| failure mode | P/C | Partial | Partial |

Izod impact failure mode key:
C-Complete break
H-Hinge break
P-Partial break

The ingredients were combined melt-mixed at 196° C. (385° F.) in a Banbury Farrel mixer for few minutes. The hot material was sheeted directly off a two-roll mill and plaques were cut from the sheets. The plaques were then pressed to a preset thickness at 193° C. (380° F.) under 50 tons. Samples were cut to various configurations required for ASTM testing methods.

The results obtained with the b-CPE/MABS modified PVC blends were compared to a standard where no b-CPE was added to the impact modifier. Both b-CPE 1 and b-CPE 2 of this experiment contains 40 wt. % Chlorine. B-CPE 1 is based on the HDPE T60-800 commercially available from Solvay having a density of 0.961 g/cm$^3$ (ASTM D-4683) and a melt index of 8.4 g/10 min (ASTM D-1238 FR-E). B-CPE 2 is based on the HDPE LM600700 available commercially from Equistar, having a density of 0.960 g/cm$^3$ and a melt index of 0.7 g/10 min.

Notched Izod impact values in these blends were measured at 32° F. and indicated a significant increase of 60 to 70% of the low temperature impact resistance upon the addition of 2 phr of b-CPE. The molecular weight of the b-CPE does not show a significant difference on the impact properties improvement. The mode of failure also is improved from a transitional type (partial and complete break) to a partial failure type, which indicates a tougher material is produced upon addition of the b-CPE.

Example 2
Blends of CPVC, Block Chlorinated Polyethylene and MABS Copolymers Impact Modifiers.

In manner similar to that described in Example 1, blends of CPVC resin (I.V.=0.92, 67 wt. %), an MABS impact modifier and several block chlorinated polyethylenes (b-CPE) were formulated according to the following recipe:

| Ingredients: | 1 | 2 | 3 | 4 | 5 | 6 |
|---|---|---|---|---|---|---|
| CPVC resin (0.91 IV, 67% Cl) (phr) | 100 | | | | | |
| dibutyltin bis-thioglycolate stabilizer | 2.4 | | | | | |
| MABS 1 | 7.0 | | | | | |
| Oxidized polyethylene | 1.3 | | | | | |
| Paraffin wax | 1.0 | | | | | |
| Titanium dioxide | 5.0 | | | | | |
| Conventional CPE (Tyrin ® 3615[(1)]) | 2.0 | | | | | |
| b-CPE 1 (MI = 8.4, 32% Cl, X = 96%) | | 2.0 | | | | |
| b-CPE 2 (MI = 8.0, 40% Cl, X = 76%) | | | 2.0 | | | |
| b-CPE 3 (MI = 8.0, 50% Cl, X = 69%) | | | | 2.0 | | |
| b-CPE 4 (MI = 0.7, 35% Cl, X = 90%) | | | | | 2.0 | |
| b-CPE 5 (MI = 0.7, 48% Cl, X = 80%) | | | | | | 2.0 |

[(1)]residual crystallinity = 2% as reported in literature.
X = residual crystallinity as calculated in Example 1.

Impact results:
Izod impact, notched, @ Room Temperature, ASTM D256

| | 1 | 2 | 3 | 4 | 5 | 6 |
|---|---|---|---|---|---|---|
| ft. lb./in. | 7.4 | 10.6 | 10.1 | 9.5 | 10.5 | 10.2 |
| std. dev. | 1.1 | 0.4 | 0.4 | 0.4 | 0.4 | 0.4 |
| failure mode | H/P | H/P | H/P | H/P | H/P | H/P |

Tensile test @ Room Temperature, ASTM D-638

| | 1 | 2 | 3 | 4 | 5 | 6 |
|---|---|---|---|---|---|---|
| Strain @ yield, psi. | 7440 | 7530 | 7600 | 7680 | 7640 | 7650 |
| std. dev. | 10 | 20 | 40 | 60 | 90 | 60 |
| Strain @ Break, psi. | 6390 | 5440 | 4640 | 6630 | 5760 | 6640 |
| std. dev. | 100 | 1960 | 448 | 142 | 1540 | 70 |
| Modulus, Kpsi. | 332 | 332 | 332 | 317 | 312 | 313 |
| std. dev. | 29 | 24 | 15 | 14 | 27 | 25 |

Izod impact failure mode key:
C - Complete break
H - Hinge break
P - Partial break Izod impact failure mode key:

C—Complete break

H—Hinge break

P—Partial break

The ingredients were combined and melt mixed in a Banbury Farrel mixer at 41 0° F. for few minutes. The hot material was sheeted directly off a two-roll mill at 400–410° F. and plaques were cut from the sheets. The plaques were then pressed to a preset thickness at 210° C. (410° F.) under 50 tons. Samples were cut to various configurations required for ASTM testing methods.

In this example, Notched Izod values were measured in blends of CPVC (I.V.=0.92, 67 wt. % Cl), 7 phr of a MABS type impact modifier and 2 phr of five different block chlorinated polyethylenes (b-CPE 1 through b-CPE 5). b-CPE 1 contains 32 wt. % chlorine and is based on a HDPE T60-800 commercially available from Solvay having a density of 0.961 g/cm$^3$ and a melt index of 8.4 g/10 min. b-CPE 2 contains 40 wt. % chlorine and is based on a HDPE 9708 commercially available from Chevron having a density of 0.962 g/cm$^3$ and a melt index of 8.0 g/10 min. b-CPE 3 contains 50 wt. % chlorine and is based on a HDPE 9708 commercially available from Chevron having a density of 0.962 g/cm$^3$ and a melt index of 8.0 g/10 min. b-CPE 4 contains 35 wt. % chlorine and is based on a HDPE LM600700 commercially available from Equistar having a density of 0.960 g/cm$^3$ and a melt index of 0.7 g/10 min. b-CPE 5 contains 48 wt. % chlorine and is based on a HDPE LM600700 commercially available from Equistar having a density of 0.960 g/cm$^3$ and a melt index of 0.7 g/10 min. The results obtained with the b-CPE/MABS modified CPVC blends were compared to a standard where the MABS/b-CPE combination was replaced by a MABS/Tyrin® CPE combination (7 phr of MBS impact modifier and 2 phr of randomly chlorinated polyethylene). The results show a 28% to 43% improvement in the impact resistance as illustrated by the Notched Izod data, upon addition of a block chlorinated polyethylene instead of a typical non-blocky Tyrin® CPE. The melt index, the chlorine content and the manufacturer of the precursor HDPE utilized to make the b-CPE does not affect impact properties improvement.

Example 3
Blends of CPVC, Block Chlorinated Polyethylene and MBS Copolymers Impact Modifiers.

In manner similar to that described in Example 2, blends of CPVC resin (I.V.=0.68, 67 wt. %), a MBS impact modifier and several block chlorinated polyethylenes (b-CPE) were formulated according to the following recipe:

| Ingredients (phr): | 1 | 2 | 3 |
|---|---|---|---|
| CPVC resin (0.68 IV, 67% Cl) | 100 | 100 | 100 |
| Dibutyltin bis-thioglycolate stabilizer | 3.5 | 3.5 | 3.5 |
| MBS 1 | 7.0 | 7.0 | 7.0 |
| Titanium dioxide | 5.0 | 5.0 | 5.0 |
| Oxidized polyethylene | 1.3 | 1.3 | 1.3 |
| Paraffin wax | 1.0 | 1.0 | 1.0 |
| Conventional CPE (Tyrin ® 3611[1]) | 3.0 | | |
| b-CPE 1 (MI = 8.4, 40% Cl, X = 60%) | | 3.0 | |
| b-CPE 2 (MI = 0.7, 40% Cl, X = 90%) | | | 3.0 |

[1]residual crystallinity = 2% as reported in literature.
X = residual crystallinity as calculated in Example 1.

Impact results:

| | | | |
|---|---|---|---|
| ft. lb./in. | 6.1 | 9.2 | 8.4 |
| std. dev. | 1.7 | 0.6 | 0.8 |
| failure mode | C/H | Partial | Partial |

Izod impact failure mode key:
C - Complete break
H - Hinge break
P - Partial break Izod impact failure mode key:

C—Complete break

H—Hingebreak

P—Partial break

The ingredients were combined and melt mixed in a Banbury Farrel mixer at 410° F. for few minutes. The hot material was sheeted directly off a two-roll mill at 400–410° F. and plaques were cut from the sheets. The plaques were then pressed to a preset thickness at 210°C. (410° F.) under 50 tons. Samples were cut to various configurations required for ASTM testing methods.

In this example, Notched Izod values were measured in blends of CPVC (I.V.=0.68, 67 wt. % Cl), 7 phr of a MBS type impact modifier and 3 phr of two different block chlorinated polyethylenes (b-CPE1 and b-CPE2). B-CPE I contains 40 wt. % chlorine and is based on a HDPE T60-800 commercially available from Solvay having a density of 0.961 g/cm$^3$ and a melt index of 8.4 g/10 min. b-CPE 2 contains 40 wt. % chlorine and is based on a HDPE LM600700 commercially available from Equistar having a density of 0.960 g/cm$^3$ and a melt index of 0.7 g/10 min. The results obtained with the b-CPE/MBS modified CPVC blends were compared to a standard where the MBS/b-CPE combination was replaced by a MBS/Tyrin® CPE combination (7 phr of MBS impact modifier and 3 phr of randomly chlorinated polyethylene). The results show a 38% to 50% improvement in the impact resistance as illustrated by the Notched Izod data, upon addition of a block chlorinated polyethylene instead of a typical non-blocky Tyrin® CPE. The mode of failure also is improved from a transitional type (hinge/complete) to a partial failure type, which indicates a tougher material is produced upon addition of the b-CPE. The melt index of the b-CPE does not show a significant difference on impact properties improvement.

Example 4

Blends of CPVC, Block Chlorinated Polyethylene and MBS Copolymers Impact Modifiers.

In manner similar to that described in Example 2, blends of CPVC resins (I.V.=0.92, 68 wt. % Cl and I.V.=0.92, 63.5 wt. % Cl), a MBS impact modifier and a block chlorinated polyethylene (b-CPE) were formulated according to the following recipe:

| Ingredients (phr) | 1 | 2 |
|---|---|---|
| CPVC resin #1 (0.92 IV, 68% Cl) | 75 | 15 |
| CPVC resin #2 (0.92 IV, 63.5% Cl) | 25 | 25 |
| Dibutyltin bis-thioglycolate stabilizer | 2.3 | 2.3 |
| MBS 2 | 8.5 | 8.5 |
| Acrylic processing aid | 3.0 | 3.0 |
| Oxidized polyethylene | 1.5 | 1.5 |
| Fatty acid ester wax | 1.0 | 1.0 |
| Titanium dioxide | 1.0 | 1.0 |
| Antioxidant | 0.3 | 0.3 |
| b-CPB (MI = 8.4, 40% Cl, X = 60%) | | 2.0 |

X = residual crystallinity as calculated in Example 1.

Impact results:
Izod impact, notched, at room temperature (ASTM D256)

| | | |
|---|---|---|
| ft. lb./in. | 7.9 | 11.0 |
| std. dev. | 0.6 | 0.3 |
| failure mode | Hinge | Hinge |

The ingredients were combined and melt mixed in a Banbury Farrel mixer at 410° F. for few minutes. The hot material was sheeted directly off a two-roll mill at 400–410° F. and plaques were cut from the sheets. The plaques were then pressed to a preset thickness at 210°C. (410° F.) under 50 tons. Samples were cut to various configurations required for ASTM testing methods.

In this example, Notched Izod values were measured in blends of 75 phr CPVC (I.V.=0.92, 68 wt. % Cl), 25 phr CPVC (I.V.=0.92, 63.5 wt. % Cl), 8.5 phr of a MBS type impact modifier and 2 phr of a block chlorinated polyethylene (b-CPE). The b-CPE contains 40 wt. % chlorine and is based on a HDPE T60-800 commercially available from Solvay having a density of 0.961 g/cm$^3$ and a melt index of 8.4 g/10 min. The results obtained with the block chlorinated modified CPVC blends were compared to a standard where no b-CPE was added. The results show a 40% improvement in the impact resistance as illustrated by the Notched Izod data, upon addition of the block chlorinated polyethylene.

Example 5

Blends of CPVC, Block Chlorinated Polyethylene and Chlorinated Polyethylene (CPE) Impact Modifiers In manner similar to that described in Example 2, blends of CPVC resin (I.V.=0.92, 67 wt. %), a CPE impact modifier and a block chlorinated polyethylene (b-CPE) were formulated according to the following recipe:

| Ingredients (phr): | 1 | 2 |
|---|---|---|
| CPVC resin (0.92 IV, 68% Cl) | 100 | 100 |
| Dibutyltin bis-thioglycolate stabilizer | 2.3 | 2.3 |
| Conventional CPE (Tyrin ® 3615[1]) | 13.0 | 13.0 |
| Titanium dioxide | 5.0 | 5.0 |
| Oxidized polyethylene | 1.5 | 1.5 |
| Fatty acid ester wax | 1.0 | 1.0 |
| Antioxidant | 0.3 | 0.3 |
| b-CPE (MI = 8.4, 15% Cl, X = 97%) | | 2.0 |

[1]residual crystallinity = 2% as reported in literature.
X = residual crystallinity as calculated in Example 1.

| Impact results: Izod Impact, notched, @ Room Temperature, ASTM D256 | | |
|---|---|---|
| ft. lb./in. | 6.3 | 9.3 |
| std. dev. | 0.5 | 1.5 |
| failure mode | C/P/H | Partial |

Izod impact failure mode key:
C-Complete break
H-Hinge break
P-Partial break

The ingredients were combined and melt mixed in a Banbury Farrel mixer at 410° F. for few minutes. The hot material was sheeted directly off a two-roll mill at 400–410° F. and plaques were cut from the sheets. The plaques were then pressed to a preset thickness at 210° C. (410° F.) under 50 tons. Samples were cut to various configurations required for ASTM testing methods.

In this example, Notched Izod values were measured in blends of 100 phr CPVC (I.V.=0.92, 68 wt. % Cl), 13 phr of a CPE Tyrin® 3615 type impact modifier and 2 phr of a block chlorinated polyethylene (b-CPE). The b-CPE contains 15 wt. % chlorine and is based on a HDPI T60-800 commercially available from Solvay having a density of 0.961 g/cm$^3$ and a melt index of 8.4 g/10 min. The results obtained with the block chlorinated modified CPVC blends were compared to a standard where no b-CPE was added. The results show a 48% improvement in the impact resistance as illustrated by the Notched Izod data, upon addition of the block chlorinated polyethylene. The mode of failure also is improved from a transitional type (hinge/complete/partial break) to a partial failure type, which indicates a tougher material is produced upon addition of the b-CPE.

Example 6

Blends of PVC, Block Chlorinated Polyethylene and Acrylic Modifiers (Modified Acrylic w/Butadiene Core) Impact Modifiers.

Blends of Geon® PVC 103EPF76-TR (I.V.=0.92), acrylic based impact modifier and a block chlorinated polyethylene (b-CPE) were formulated according to the following recipe:

| Ingredients (phr): | 1 | 2 |
|---|---|---|
| PVC resin (0.90 IV) | 100 | 100 |
| Dibutyltin bis-thioglycolate stabilizer | 1.5 | 1.5 |
| Acrylic modifier 1 | 4.0 | 4.0 |
| Acrylic processing aid | 0.5 | 0.5 |
| Calcium stearate | 1.5 | 1.5 |
| Ethylene bis-stearate | 1.5 | 1.5 |
| Oxidized polyethylene | 0.1 | 0.1 |
| Calcium carbonate | 8.0 | 8.0 |
| Titanium dioxide | 1.0 | 1.0 |
| b-CPE (MI = 8.4, 10 wt. % Cl, X = 97%) | | 0.5 |

X = residual crystallinity as calculated in Example 1.

| Impact results: Izod impact, notched, @ Room Temperature, ASTM D256 | | |
|---|---|---|
| ft. lb./in. | 2.5 | 2.5 |
| std. dev. | 0.4 | 0.2 |
| failure mode | Complete | Complete |

The ingredients were combined melt-mixed at 196° C. (385° F.) in a Banbury Farrel mixer for few minutes. The hot material was sheeted directly off a two-roll mill and plaques were cut from the sheets. The plaques were then pressed to a preset thickness at 193° C. (380° F.) under 50 tons. Samples were cut to various configurations required for ASTM testing methods.

The results obtained with the b-CPE/acrylic modified PVC blends were compared to a standard where no b-CPE was added to the impact modifier. The b-CPE of this experiment contained 10 wt. % of chlorine and is based on the HDPE T60-800 commercially available from Solvay, having a density of 0.961 g/cm$^3$ and a melt index of 8.4 g/10 min. Notched Izod impact values in these blends were measured at room temperature and indicated no significant increase of the impact resistance upon the addition of 0.5 phr of b-CPE. These results confirm that not all impact modifier packages will be enhanced by the addition of our block chlorinated polyethylene.

Example 7

Blends of CPVC, Block Chlorinated Polyethylene and Acrylic Modifiers (Modified Acrylic w/Butadiene Core) Impact Modifiers.

In manner similar to that described in Example 6, blends of CPVC resins (I.V.=0.92, 67 wt. %), a acrylic-based impact modifier and block chlorinated polyethylene (b-CPE) were formulated according to the following recipe:

| Ingredients (phr): | 1 | 2 |
|---|---|---|
| CPVC resin (0.92 IV, 67% Cl) | 100 | 100 |
| Dibutyltin bis-thioglycolate stabilizer | 3.0 | 3.0 |
| Acrylic modifier 2 | 12.0 | 12.0 |
| Oxidized polyethylene | 1.5 | 1.5 |
| Titanium dioxide | 4.0 | 4.0 |
| b-CPE (MI = 8.4, 15% Cl, X = 97%) | | 1.0 |

X = residual crystallinity as calculated in Example 1.

| Impact results: Izod impact, notched, @ Room Temperature, ASTM D256 | | |
|---|---|---|
| ft. lb./in. | 9.3 | 9.1 |
| std. dev. | 1.2 | 0.4 |
| failure mode | Partial | Partial |

The ingredients were combined melt-mixed at 410° F. in a Banbury Farrel mixer for few minutes. The hot material was sheeted directly off a two-roll mill and plaques were cut from the sheets. The plaques were 30 then pressed to a preset thickness at 410° F. under 50 tons. Samples were cut to various configurations required for ASTM testing methods.

The results obtained with the b-CPE/acrylic modified CPVC blends were compared to a standard where no b-CPE was added to the impact modifier. The b-CPE of this experiment contains 15 wt. % of chlorine and is based on the HDPE T60-800 commercially available from Solvay, having a density of 0.961 g/cm$^3$ and a melt index of 8.4 g/10 min. Notched Izod impact values in these blends were measured at room temperature and indicated no significant increase of the impact resistance upon the addition of 1 phr of this b-CPE. These results confirm that not all impact modifier packages will be enhanced by the addition of our block chlorinated polyethylene.

Example 8
Synthesis of Block Chlorinated Polyethylene from UV Irradiation

A 2-gallon jacketed reactor (suitable for chlorination reactions) provided with means of agitation, feed lines, pressure and temperature recording instruments, and appropriate valves and piping was charged with 4,000 g of demineralized water, 0.3 g of a commercial wetting agent (Thompson-Hayward T-DET-N8) and 300 g of high density polyethylene powder (Microthene™ FA700-00 from Quantum Chemical Corporation), having a density of 0.953 g/cm$^3$ as measured by ASTM D-1505 on compression molded samples and a melt index of 10.5 g/10 min according to ASTM D-1238 FR-E. Microthene™ powder particles, which are spherical with an average particle size of ca. 20 μm, were slurried in water. After evacuation to 6 psia (pounds per square inch absolute), nitrogen was charged to the reactor until the pressure reached 104 psia. The reactor was again evacuated to 6 psia and nitrogen was added until the pressure was 102 psia. The reactor was again evacuated to 6 psia. The temperature was then increased to 50° C. Chlorine was added until the pressure in the reactor reached 28 psia. The reactor was evacuated to 9 psia and chlorine was added to 30 psia. The reactor was then evacuated to 10 psia. The agitation was started at ca. 500 rpm. Liquid chlorine was added until the pressure reached 50 psia. The reaction was initiated by the presence of free radicals generated via UV irradiation. Chlorine was fed such as to maintain a constant reaction temperature and pressure throughout the reaction (50° C. and 50 psia). The total volume of liquid chlorine added was 400 cm$^3$. After the completion of chlorine addition, the temperature was maintained at 50° C. with the UV light still turned on. After 190 minutes, the pressure dropped to 7 psia, indicating the reaction was complete. The polymer was removed from the slurry and given multiple extractions with hot water until all the acid was removed. The product was dried in a vacuum oven at 50° C. The chlorine content was measured by $^{13}$C-NMR as described previously and found to be 50 wt. % chlorine. The residual crystallinity was measured by DSC according to the above outlined Thermal Analysis (TA) test procedure (ASTM D-3417) and found to contain at least 70% residual crystallinity.

Example 9
Chlorinated Polyethylene from UV Irradiation

Essentially the procedure of Example 8 was used. 300 g of a high density polyethylene pellets (HDPE 9602) purchased from Chevron Chemical, having a density of 0.960 g/cm$^3$ (ASTM D-4683) and a melt index of 0.25 g/10 min (ASTM D-1238 FR-E) were cryogenically ground to an average particle size of ca. 250 μm and then charged into the reactor. The total volume of chlorine fed was 250 cm$^3$. The chlorination was completed in 120 minutes. The chlorine content was measured by $^{13}$C-NMR as described previously and found to be 38 wt. % chlorine. The residual crystallinity was measured by DSC according to the above outlined TA test procedure (ASTM D-3417) and found to contain 98% residual crystallinity.

What is claimed:

1. A vinyl chloride polymer composition comprising:
  a) at least one vinyl chloride polymer resin having at least 70 wt. % repeating units polymerized from a vinyl chloride monomer;
  b) at least one block chlorinated polyolefin having above 25 wt. % residual blocks of crystalline polyolefin; and
  c) at least one impact modifier selected from the group consisting of a high rubber graft copolymer, a randomly chlorinated polyethylene elastomer, and mixtures thereof.

2. The vinyl chloride polymer composition according to claim 1 wherein said block chlorinated polyolefin is selected from block chlorinated polyethylene, block chlorinated polypropylene, block chlorinated poly(1-butene), and mixtures thereof.

3. The vinyl chloride polymer composition according to claim 2, wherein the amount of said block chlorinated polyolefin is present from about 0.1 to about 10 parts by weight and said impact modifier is present in the amount of about 1 to 30 parts by weight based on 100 parts by weight of vinyl chloride resin.

4. The vinyl chloride polymer composition according to claim 3, wherein said high rubber graft copolymer impact modifier is selected from the group consisting of methylmethacrylate-butadiene-styrene copolymers, acrylonitrile-butadiene-styrene copolymers, and mixtures thereof.

5. The vinyl chloride polymer composition according to claim 4, wherein the amount of said block chlorinated polyolefin is from about 0.5 to about 5 parts by weight and the amount of said impact modifier is from about 3 to about 20 parts by weight based on 100 parts by weight of said vinyl chloride polymer resin.

6. The vinyl chloride polymer composition according to claim 1, wherein said block chlorinated polyolefin has a chlorine content of from about 10 to about 50 wt. %.

7. The vinyl chloride polymer composition according to claim 1, 2, 4, or 6 wherein the residual blocks of crystalline polyolefin in said block chlorinated polyolefin is above about 30 wt. %.

8. The vinyl chloride polymer composition according to claim 6, molded or extruded into an article.

9. The vinyl chloride polymer composition according to claim 8, wherein said article is vinyl siding, sheathing, an injection molded article, or a transfer molded article.

10. A chlorinated polyvinyl chloride composition comprising:
  a) at least one chlorinated polyvinyl chloride resin having an inherent viscosity from about 0.5 to about 1.2 and a bound chlorine content from about 59 to about 74 wt. % based upon the weight of the chlorinated polyvinyl chloride resin;
  b) at least one block chlorinated polyolefin having above 25 wt. % residual blocks of crystallizable polyolefin; and
  c) at least one impact modifier selected from the group consisting of high rubber graft copolymers, chlorinated polyethylene elastomers, and mixtures thereof.

11. The chlorinated vinyl chloride composition of claim 10 wherein said block chlorinated polyolefin is selected from block chlorinated polyethylene, block chlorinated polypropylene, block chlorinated poly(1-butene), and mixtures thereof.

12. The chlorinated polyvinyl chloride composition according to claim 11, wherein the amount of said block chlorinated polyolefin is from about 0.1 to about 10 parts by weight and said impact modifier is present in an amount from about 1 to about 30 parts by weight per 100 parts by weight of said CPVC resin.

13. The chlorinated polyvinyl chloride composition according to claim 12, wherein the amount of said block chlorinated polyolefin is present from about 0.25 to about 5 parts by weight and said impact modifier is present in an amount from about 5 to about 15 parts by weight per 100 parts by weight of CPVC resin.

14. The chlorinated polyvinyl chloride composition according to claim 13, wherein said impact modifier is selected from the group consisting of methylmethacrylate-butadiene-styrene copolymers, acrylonitrile-butadiene-styrene copolymers, and mixtures thereof.

15. The chlorinated polyvinyl chloride composition according to claim 10, wherein said block chlorinated polyolefin has a chlorine content of from about 15 to about 60 wt. % based on the weight of said chlorinated polyolefin.

16. The chlorinated polyvinyl chloride composition according to claim 10, 11, 14, or 15 wherein the residual blocks of crystalline polyolefin in said block chlorinated polyolefin is above about 30 wt. %.

17. The chlorinated polyvinyl chloride composition according to claim 15, molded or extruded into an article.

18. The chlorinated polyvinyl chloride composition according to claim 17 wherein said article is vinyl siding, sheathing, an injection molded article, or a transfer molded article.

19. A polymer composition comprising
   a) a blend of polyvinyl chloride resin and chlorinated polyvinyl chloride resin;
   b) at least one block chlorinated polyolefin having above 25 wt. % residual blocks of crystalline polyolefin; and
   c) at least one impact modifier selected from the group consisting of a high rubber graft copolymer, a randomly chlorinated polyethylene elastomer, and mixtures thereof.

20. The polymer composition of claim 19 wherein said polyvinyl chloride resin comprises at least 70 wt. % repeating units polymerized from a vinyl chloride monomer, and said chlorinated polyvinyl chloride resin is selected from the group consisting of a resin with an inherent viscosity from about 0.5 to 1.2 and a bound chlorine content from about 59 to about 74 wt. % based on the weight of the chlorinated polyvinyl chloride resin.

21. The composition of claim 20 wherein said block chlorinated polyolefin is selected from block chlorinated polyethylene, block chlorinated polypropylene, block chlorinated poly(1-butene), and mixtures thereof.

22. The vinyl chloride polymer composition according to claim 21, wherein the amount of said block chlorinated polyolefin is present from about 0.1 to about 10 parts by weight and said impact modifier is present in the amount of about 1 to 30 parts by weight based on 100 parts by weight of vinyl chloride resin.

23. The vinyl chloride polymer composition according to claim 22, wherein said high rubber graft copolymer impact modifier is selected from the group consisting of methylmethacrylate-butadiene-styrene copolymers, acrylonitrile-butadiene-styrene copolymers, and mixtures thereof.

24. The vinyl chloride polymer composition according to claim 23, wherein the amount of said block chlorinated polyolefin is from about 0.5 to about 5 parts by weight and the amount of said impact modifier is from about 3 to about 20 parts by weight based on 100 parts by weight of said vinyl chloride polymer blend.

25. The vinyl chloride polymer composition according to claim 19, wherein said block chlorinated polyolefin has a chlorine content of from about 10 to about 60 wt. %.

26. The vinyl chloride polymer composition according to claim 19, 20, 23, or 25 wherein the residual blocks of crystalline polyolefin in said block chlorinated polyolefin is above about 30 wt. %.

27. The vinyl chloride polymer composition according to claim 25, molded or extruded into an article.

28. A process for impact modifying a vinyl polymer composition comprising a step of blending a vinyl halide polymer resin in melt form with at least one block chlorinated polyolefin and an impact modifier selected from the group consisting of high rubber graft copolymers, CPE elastomers, and mixtures thereof to form a dispersed rubber phase, wherein said vinyl halide polymer resin is selected from the group consisting of polyvinyl chloride, chlorinated polyvinyl chloride and mixtures thereof; wherein said polyvinyl chloride resin has at least 70 mole percent repeating units polymerized from a vinyl chloride monomer; wherein said chlorinated polyvinyl chloride resin has from about 0.5 to about 1.2 inherent viscosity and a bound chlorine content from about 59 to about 74 wt. %; wherein said block chlorinated polyolefin has above 25 wt. % residual blocks of crystallizable polyolefin based upon the weight of said chlorinated polyolefin; and wherein said impact modifier is selected from the group consisting of methylmethacrylate-butadiene-styrene copolymers, acrylonitrile-butadiene-styrene copolymers, randomly chlorinated polyethylenes impact modifiers, and mixtures thereof.

29. The process according to claim 28, wherein said block chlorinated polyolefin has from about 10 to about 60 wt. % bound chlorine, and mixtures thereof.

30. The process according to claim 28, wherein said block chlorinated polyolefin comprises block chlorinated polyethylene, block chlorinated polypropylene and block chlorinated poly(1-butene).

31. The process according to claim 28, 29, or 30 wherein the residual blocks of crystalline polyolefin in said block chlorinated polyolefin is above about 30 wt. %.

32. The composition according to claim 7 wherein the residual blocks of crystalline polyolefin in said chlorinated polyolefin is above about 50 wt. %.

33. The composition according to claim 7 wherein the residual blocks of crystalline polyolefin in said chlorinated polyolefin is above about 70 wt. %.

34. The composition according to claim 7 wherein the residual blocks of crystalline polyolefin in said chlorinated polyolefin is above about 90 wt. %.

35. The composition according to claim 16 wherein the residual blocks of crystalline polyolefin in said chlorinated polyolefin is above about 50 wt. %.

36. The composition according to claim 16 wherein the residual blocks of crystalline polyolefin in said chlorinated polyolefin is above about 70 wt. %.

37. The composition according to claim 16 wherein the residual blocks of crystalline polyolefin in said chlorinated polyolefin is above about 90 wt. %.

38. The process according to claim 31 wherein the residual blocks of crystalline polyolefin in said chlorinated polyolefin is above about 50 wt. %.

39. The process according to claim 31 wherein the residual blocks of crystalline polyolefin in said chlorinated polyolefin is above about 70 wt. %.

40. The process according to claim 31 wherein the residual blocks of crystalline polyolefin in said chlorinated polyolefin is above about 90 wt. %.

* * * * *

UNITED STATES PATENT AND TRADEMARK OFFICE
CERTIFICATE OF CORRECTION

| | | |
|---|---|---|
| PATENT NO. | : 6,277,915 B1 | |
| DATED | : August 21, 2001 | |
| INVENTOR(S) | : Carole Angele Lepilleur et al. | |

It is certified that error appears in the above-identified patent and that said Letters Patent is hereby corrected as shown below:

<u>Title page,</u>
Item [75], Inventors, please add the third inventor -- Arthur Leonard Backman, Brecksville --.

Signed and Sealed this

Twenty-seventh Day of August, 2002

Attest:

JAMES E. ROGAN
Attesting Officer
Director of the United States Patent and Trademark Office